United States Patent
Paradkar et al.

(10) Patent No.: US 12,001,785 B2
(45) Date of Patent: Jun. 4, 2024

(54) MINING MULTI-PARTY COLLABORATION PLATFORMS TO CREATE TRIAGING TREES AND PLAYBOOKS

(71) Applicant: International Business Machines Corporation, Armonk, NY (US)

(72) Inventors: Amitkumar Manoharrao Paradkar, Mohegan Lake, NY (US); Amar P. Azad, Bangalore (IN); Ajay Gupta, New Delhi (IN); Suranjana Samanta, Bangalore (IN); Prateeti Mohapatra, Bangalore (IN); Harshit Kumar, Delhi (IN); Eyal Shnarch, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 17/017,202

(22) Filed: Sep. 10, 2020

(65) Prior Publication Data
US 2022/0075936 A1     Mar. 10, 2022

(51) Int. Cl.
*G06F 16/22* (2019.01)
*G06F 16/28* (2019.01)
(Continued)

(52) U.S. Cl.
CPC .......... *G06F 40/20* (2020.01); *G06F 16/2228* (2019.01); *G06F 16/285* (2019.01);
(Continued)

(58) Field of Classification Search
CPC .............. G06F 16/2228; G06F 16/285; G06F 16/3329; G06F 16/9027
See application file for complete search history.

(56) References Cited

U.S. PATENT DOCUMENTS

| 5,630,125 A | 5/1997 | Zellweger |
| 8,612,233 B2 | 12/2013 | Anand |

(Continued)

FOREIGN PATENT DOCUMENTS

| AU | 2013230453 A | 9/2013 |
| CN | 109740951 | 1/2019 |

OTHER PUBLICATIONS

Wang, Qing, et al. "Leveraging ai in service automation modeling: From classical ai through deep learning to combination models." International Conference on Service-Oriented Computing. Springer, Cham, 2019 (Year: 2019).*

(Continued)

*Primary Examiner* — Bhavesh M Mehta
*Assistant Examiner* — Nandini Subramani
(74) *Attorney, Agent, or Firm* — Ryan, Mason & Lewis, LLP

(57) ABSTRACT

Methods, systems, and computer program products for mining multi-party collaboration platforms to create triaging trees and playbooks are provided herein. A computer-implemented method includes obtaining, from a multi-user platform, conversations related to at least one technical issue; generating a plurality of triaging trees by analyzing the conversations, wherein each of the triaging trees stores information corresponding to temporal sequences of steps related to diagnosing and resolving said at least one technical issue; and deriving a playbook for resolving said at least one technical issue at least in part by combining two or more of the plurality of triaging trees.

20 Claims, 12 Drawing Sheets

(51) Int. Cl.
  *G06F 16/332*  (2019.01)
  *G06F 16/901*  (2019.01)
  *G06F 40/20*  (2020.01)
  *G06N 3/04*  (2023.01)

(52) U.S. Cl.
  CPC ...... *G06F 16/3329* (2019.01); *G06F 16/9027* (2019.01); *G06N 3/04* (2013.01)

(56) References Cited

U.S. PATENT DOCUMENTS

| | | | |
|---|---|---|---|
| 9,116,984 B2 | 8/2015 | Caldwell et al. | |
| 9,378,202 B2 | 6/2016 | Larcheveque | |
| 10,120,864 B2* | 11/2018 | Sandor | G06F 16/353 |
| 10,409,913 B2 | 9/2019 | Bhatt et al. | |
| 11,087,094 B2* | 8/2021 | Chatterjee | G06N 5/022 |
| 11,416,555 B2* | 8/2022 | Hoshino | G10L 15/18 |
| 2005/0234973 A1* | 10/2005 | Zeng | G06N 5/02 |
| 2015/0178371 A1 | 6/2015 | Seth et al. | |
| 2017/0255536 A1* | 9/2017 | Weissinger | G06F 16/9535 |
| 2017/0330106 A1* | 11/2017 | Lindsley | G06N 5/043 |
| 2018/0285775 A1* | 10/2018 | Bergen | G06N 20/00 |
| 2020/0285663 A1* | 9/2020 | Karn | G06N 3/045 |
| 2021/0012179 A1* | 1/2021 | Kalia | G06F 40/284 |
| 2022/0012633 A1* | 1/2022 | Molahalli | H04L 41/50 |

OTHER PUBLICATIONS

Gupta, Abhirut, et al. "Mining procedures from technical support documents." (2018) (Year: 2018).*

W. Shalaby, A. Arantes, et. al., "Building chatbots from large scale domain-specific knowledge bases: challenges and opportunities," 2020 IEEE International Conference on Prognostics and Health Management (ICPHM), Detroit, MI, USA, 2020, pp. 1-8. (Year: 2020).*

Lee, Chung-Hong, and Tzan-Feng Chien. "Leveraging microblogging big data with a modified density-based clustering approach for event awareness and topic ranking." Journal of Information Science 39.4 (2013): 523-543. (Year: 2013).*

Sethuramalingam Subramaniam et al., COBOTS—A Cognitive Multi-Bot Conversational Framework for Technical Support, Proceedings of the 17th International Conference on Autonomous Agents and MultiAgent, Jul. 2018.

Ingo Averdunk, Collaborate by using ChatOps, IBM, available at https://www.ibm.com/garage/method/practices/manage/chatops/, accessed Sep. 9, 2020.

Hamid R. Motahari-Nezhad et.al, IT Support Conversation Manager: A Conversation-Centered Approach and Tool for Managing Best Practice IT Processes, 14th IEEE International Enterprise Distributed Object Computing Conference, 14th IEEE International Enterprise Distributed Object Computing Conference, Oct. 2010.

Customer Storybook, Slack, available at https://a.slackedge.com/88223/marketing/downloads/resources/Slack_Customer_Storybook.pdf, last accessed Sep. 9, 2020.

Qing Wang et.al, Constructing the Knowledge Base for Cognitive IT Service Management, IEEE International Conference on Services Computing (SCC), Jun. 2017.

* cited by examiner

MINING MULTI-PARTY COLLABORATION PLATFORMS TO CREATE TRIAGING TREES AND PLAYBOOKS

BACKGROUND

The present application generally relates to information technology and, more particularly, to mining collaborative platforms to resolve incidents in technical systems.

Generally, IT support systems rely heavily on recommendations from documents (e.g., training manuals, product support guidelines, etc.) for resolving incidents. However, many of these incidents can be quite complex. Apart from such documents, experience of an IT expert is often helpful to resolve the complex incidents.

SUMMARY

In one embodiment of the present disclosure, techniques for mining multi-party collaboration platforms to create triaging trees and playbooks are provided. An exemplary computer-implemented method includes the steps of obtaining, from a multi-user platform, conversations related to at least one technical issue; generating a plurality of triaging trees by analyzing the conversations, wherein each of the triaging trees stores information corresponding to temporal sequences of steps related to diagnosing and resolving said at least one technical issue; and deriving a playbook for resolving said at least one technical issue at least in part by combining two or more of the plurality of triaging trees.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Information Technology (IT) support experts and/or Site Reliability Engineers (SREs)/subject matter experts (SMEs) frequently collaborate using multi-user platforms to resolve incoming issues based on their experiences. These conversations include helpful insights and knowledge that are not included in the documents that experts typically rely upon (training manuals, product support guidelines, etc.). For example, SREs often use collaborative channels (e.g., Slack®) to discuss resolutions of incidents.

As described herein, an exemplary embodiment includes automatically processing chat history of such channels to understand actions taken to resolve a particular incident for a given set of symptoms. This sequence of triplets (e.g., <Symptoms, Actions, Result>) can be stored in the form of a triaging tree for a given incident. The triaging trees can then be used to obtain a fast diagnosis for an issue of a similar nature in the future. According to at least one embodiment, a factual summary of an issue can also be obtained by converting the triaging tree to human readable textual. Additionally, a cluster of triaging trees, corresponding to a similar issue, can be merged to create a playbook. Such a playbook can then be used as a real-time, practical guide to resolve an issue. The playbook can also be used to enhance the skills of experts as it allows various aspects of an issue to be more thoroughly understood.

Accordingly, the term "conversation" as used herein is intended to be broadly construed, so as to encompass, for example, digital conversations or interactions between two or more users. In at least some examples, the conversations may be in the form of text that is input by the two or more users over a communications platform (e.g., Slack®).

The term "triaging tree" as used herein generally refers to a tree data structure that is implemented to represent important parts of a conversation. A triaging tree is constructed based on the relative semantic and sequential information corresponding to the important parts of the conversation as described in more detail elsewhere herein. A given triaging tree is generally associated with at least one issue or technical problem.

The term "playbook" as used herein generally refers to a sequence of steps to be performed to diagnose and/or resolve one or more issues. In some example embodiments, a playbook is generated based on a set of triaging trees related to similar conversations.

Figure 1:
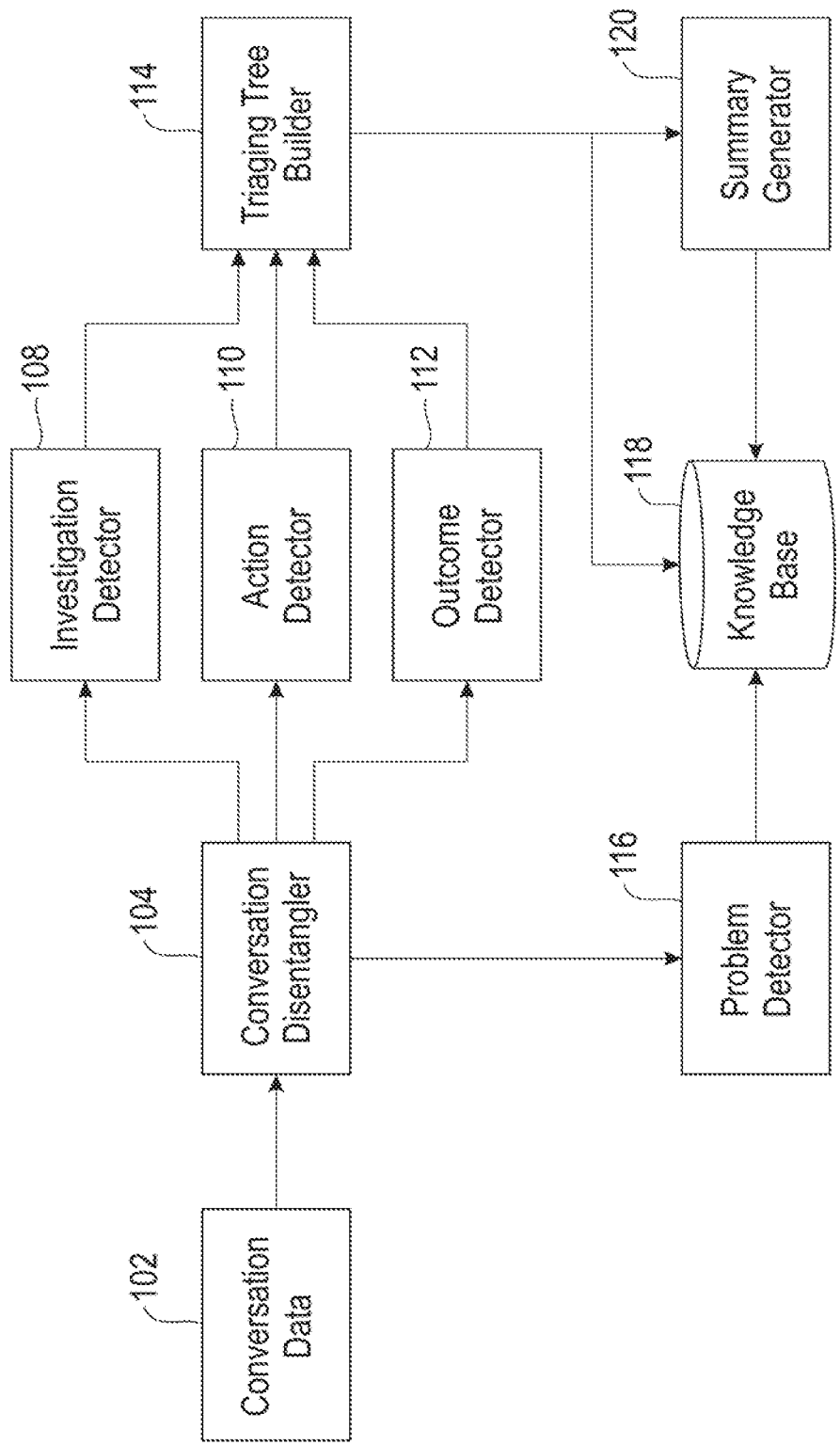
FIG. 1 is a diagram illustrating a system architecture in accordance with exemplary embodiments.

FIG. 1 is a diagram illustrating a system architecture in accordance with exemplary embodiments. By way of illustration, FIG. 1 depicts a conversation disentangler 104, an investigation detector 108, action detector 110, and an outcome detector 112, a tree builder 114, a problem detector 116, a knowledge base 118, and a summary generator 120.

In the FIG. 1 embodiment, the conversation disentangler 104 obtains conversation data 102. The conversation data 102 may be retrieved, for example, from a multi-user communication platform. In such a platform with multiple users, the following two issues can occur. First, a conversation related to a specific problem and/or issue may include further content (e.g., unrelated to the specific problem). Second, even within a conversation that is related to a single problem, a user can post a new question or response out of turn which can cause difficulty in understanding the question and response pairs or temporal misalignment of symptom and action results. As such, the conversation disentangler 104 parses and identifies content (e.g., text) in the conversation data 102 that relates to technical problems and provides such data to each of the detectors 108, 110, 112, and 116. For example, the conversation disentangler 104 may label one or more parts of a conversation that identify a particular problem and also one or more parts of the conversation related to that problem (such as, for example, parts corresponding to questions, investigations, symptoms, resolutions, etc.). Any remaining parts of the conversation may be considered unrelated to the particular problem.

The problem detector 116 analyzes the parts of the conversations that identify the problem (as determined by the conversation detangler 104) to detect and/or extract entities and entity values related to the problem. The parts of the conversation analyzed by problem detector 116 and the resulting entities and entity values may be stored in the knowledge base 118 as described in more detail elsewhere herein. As such, the problem detector 116 may identify the problem around which a given conversation takes place aiming to diagnose and resolve it.

In the FIG. 1 embodiment, the investigation detector 108, action detector 110, and outcome detector 112 analyze the parts of the conversations in the conversation data 102 that correspond to investigatory language, actions, and outcomes, respectively, as determined by the conversation disentangler 104. This can be done in a similar manner as described above with respect to the problem detector 116. For example, the investigation detector 108 may detect and/or extract entities and entity values corresponding to the investigatory language. The entities and entity values determined by each of the detectors 108, 110, and 112 are provided to the triaging tree builder 114, which builds a triaging tree for each conversation. The summary generator 120 generates multi-granular summaries for each of the triaging trees. The triaging trees and multi-granular summaries are also stored in the knowledge base 118. The operations of the various components of FIG. 1 are described in more detail herein.

According to at least one embodiment, a knowledge base (e.g., knowledge base 118) is created which stores triaging trees, diagnostic summaries, and playbooks from multiuser conversations in an IT Operations (ITOps) support environment. The process for building a triaging tree includes determining objective-specific conversation labels for parts of the conversation (also referred to herein as "utterances"). For example, a set of labels may include labels for issues, symptoms, subsequent investigations, actions, results, and resolutions. Additionally, the process includes detecting entities and entity values for utterances with each label. For example, a relationship-attention model may be used to detect the label values and to populate the triaging tree with the utterances and utterance entity/entity values as instances.

Figure 2:
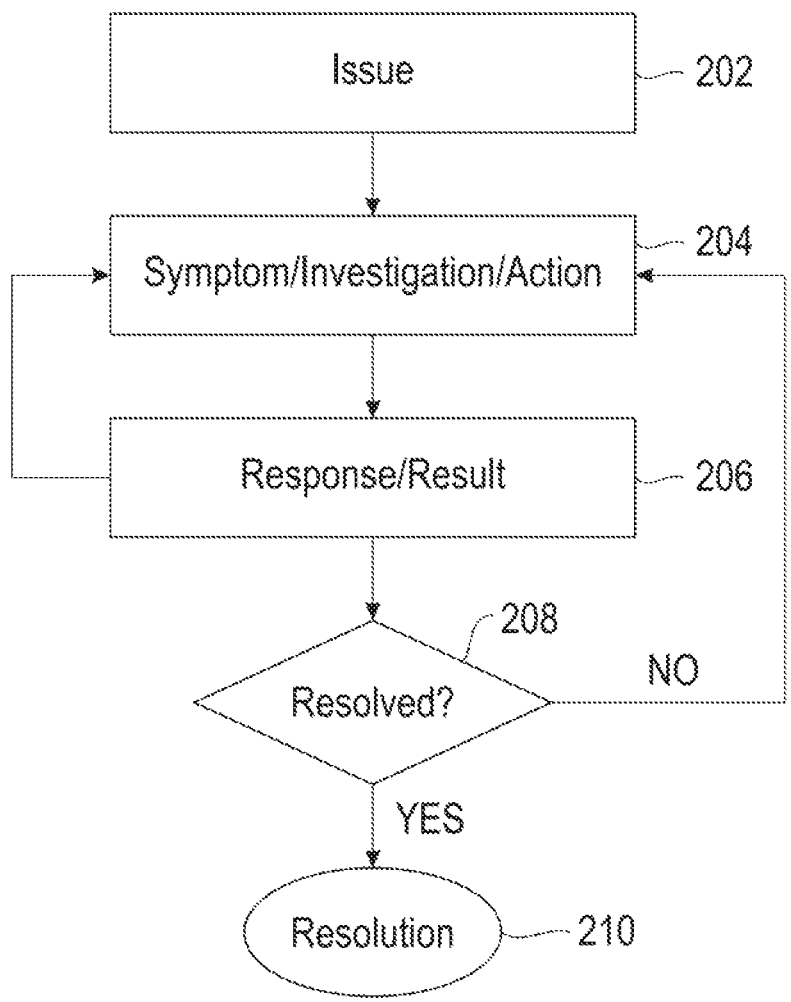
FIG. 2 is a diagram illustrating a process flow diagram for creating a triaging tree in accordance with exemplary embodiments.

FIG. 2 is a diagram illustrating a process flow diagram for creating a triaging tree for a conversation in accordance with exemplary embodiments. The process flow diagram shown in FIG. 2 may correspond to steps performed by the triaging tree builder 114 in FIG. 1. In the example shown in FIG. 2, step 202 includes creating a new triaging tree with a root node corresponding to a part of the conversation that is identified as being an issue by the conversation disentangler 104.

Step 204 includes creating a new node as a child of the root node for a part of the conversation that is labeled as a symptom, investigation, or action by the conversation disentangler 104. Step 204 may also include storing entities and entity values detected in the part of the conversation corresponding to the symptom, investigation, or action. For instance, if the new node corresponds to an action, then the new node may store the entities and entity values detected by action detection 110.

Step 206 includes creating a new child node for a part of the conversation that is labeled as a response or result. This node is dependent on the node created at step 202. Step 206 may also include storing the entities and entities values as output by the outcome detector 112, for example.

Step 208 determines if there is a part of a conversation corresponding to the response/result from step 206 that is identified as a resolution by the conversation disentangler 104. If yes, step 210 includes creating a resolution node as a child node of the response or result node. If no, then the process returns to step 204 to process further parts of the conversation labeled as symptoms, investigation, and/or actions.

One or more example embodiments include using machine learning techniques to build the triaging tree from a given conversation, such as by using a pretrained bi-directional long Short-Term Memory (LSTM) with a Conditional Random Field (CRF) layer (BiLSTM CRF), for example. The BiLSTM CRF model is trained to determine appropriate labels (or intents) for utterances. The BiLSTM CRF model may be implemented by the conversation disentangler 104 to identify the objective-specific conversation utterance labels (such as, for example, PROBLEM, QUESTION, INVESTIGATION, SYMPTOM, RESOLUTION, etc.). The Bi-LSTM CRF model labels utterances in a conversation so that the dependency between the labels is captured.

For each utterance that is labeled, entities and entity values are detected and extracted. The intent-specific entity and entity value detection may be performed using a pre-trained sequence labelling method (such as, for example, CRF). Each of the detectors 108, 110, 112, and 116 may implement such a pre-trained sequence labelling method to detect the entities and the entity values. For example, consider the following utterance: "Assistant Premium customers may see intermittent connection failures accessing Visual Recognition & Assistant API." This utterance is assigned a "problem" label, and the extracted entities and values output by the problem detector 116 for this utterance may be as follows: "entities": {"service": "Assistant", "problem_desc": "intermittent connection failures", "component": ["Visual Recognition", "Assistant API"]}.

The triaging tree is then populated given an utterance, a label of the utterance, the corresponding entity, associated entity values, and relationship-attention model. In one or more example embodiments, each node of the triaging tree may include two properties: a description and the entities. In such embodiments, the relationship-attention model approach for populating a triaging tree for a given utterance in a conversation may include the following:

If an utterance label is ISSUE/PROBLEM, then a new tree is created with a root node as the utterance;

If an utterance label is ADVICE or INVESTIGATE, then a node is created as a child of the root node;

If an utterance label is ACTION, then the attention model is used to determine the pre-influencing label;

If an utterance label is RESOLUTION, then the attention model is used to determine the pre-influencing label;

If an utterance label is FAILED or RESOLUTION, then the attention model is used to determine the pre-influencing label.

In at least some example embodiments, a given triaging tree may be output to a user for validation. The user may provide input corresponding to suggestions to retrain the attention model. Such feedback not only helps in populating the triaging tree in the future, but also helps produce a higher quality intent labeling model (e.g., more efficient and/or accurate).

In some example embodiments, both the entities and description (e.g., the text of an utterance) can be used for generating a multi-granular summary using one of the following techniques.

Template-based: "Slots" in preconfigured texts are filled using information stored in the nodes of a triaging tree. Given a triaging tree, the preconfigured texts are combined to form a suitable template.

Neural network-based: Mapping between trees and summary texts can be learned using neural network.

Hybrid: A neural network is used to rephrase statements from the triaging tree to be combined by a template.

The multi-granular summary generation allows the amount of details in the generated summary to be controlled based on, for example, the choice of a user. The resolution node contains the most important action performed to solve a given issue, while the path from the root to node describes the resolution step from start, and finally the whole tree represents the important artifacts from the whole conversation. This fact motivates the approach of generating multi-granular summary. As an example, a multi-granular summary may include the following levels: a concise-level summary (including the problem and resolution steps, for example); a mid-level summary (pertaining to the path from the root node to a resolution node, for example); and a fine-level summary (summarizing the complete triaging tree, for example).

Figure 3A:
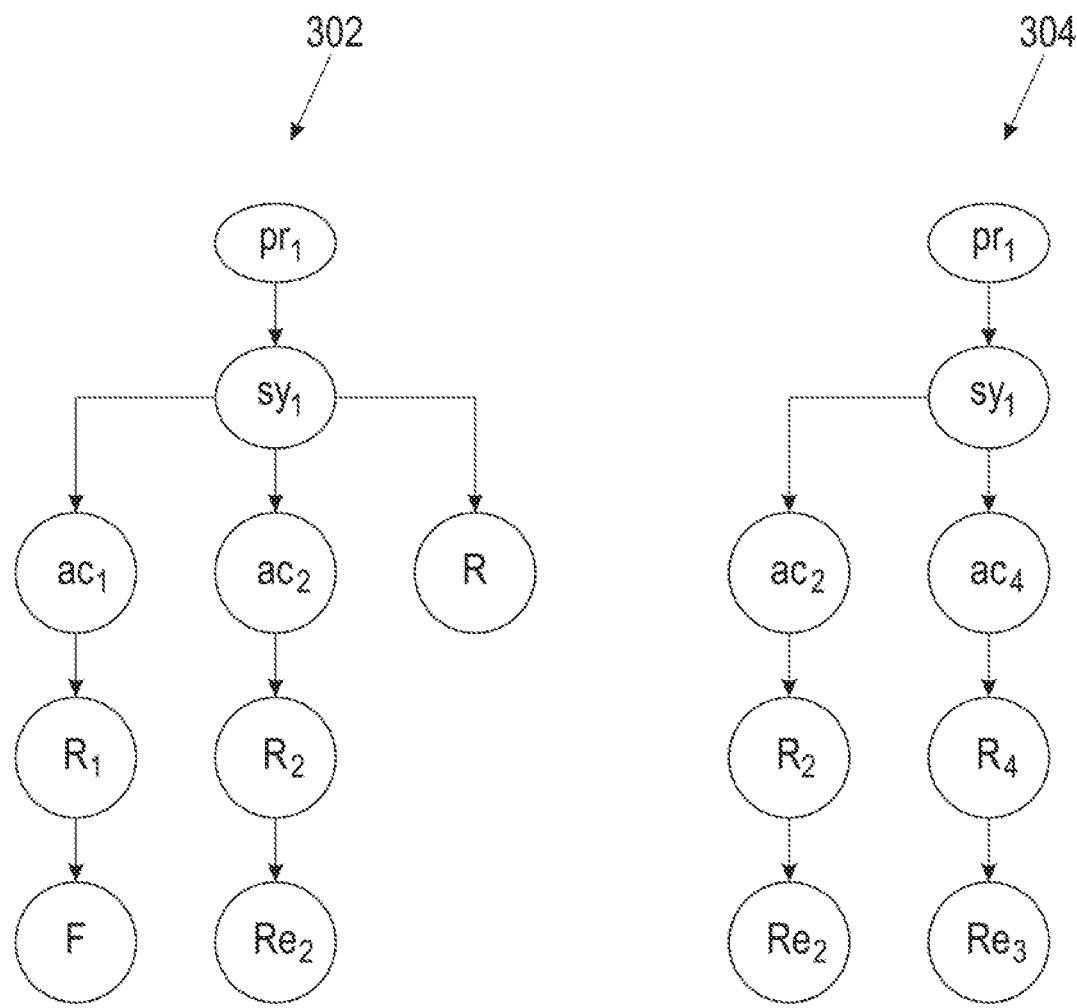
FIGS. 3A and 3B show a first example of combining triaging trees in accordance with exemplary embodiments.
Figure 3B:
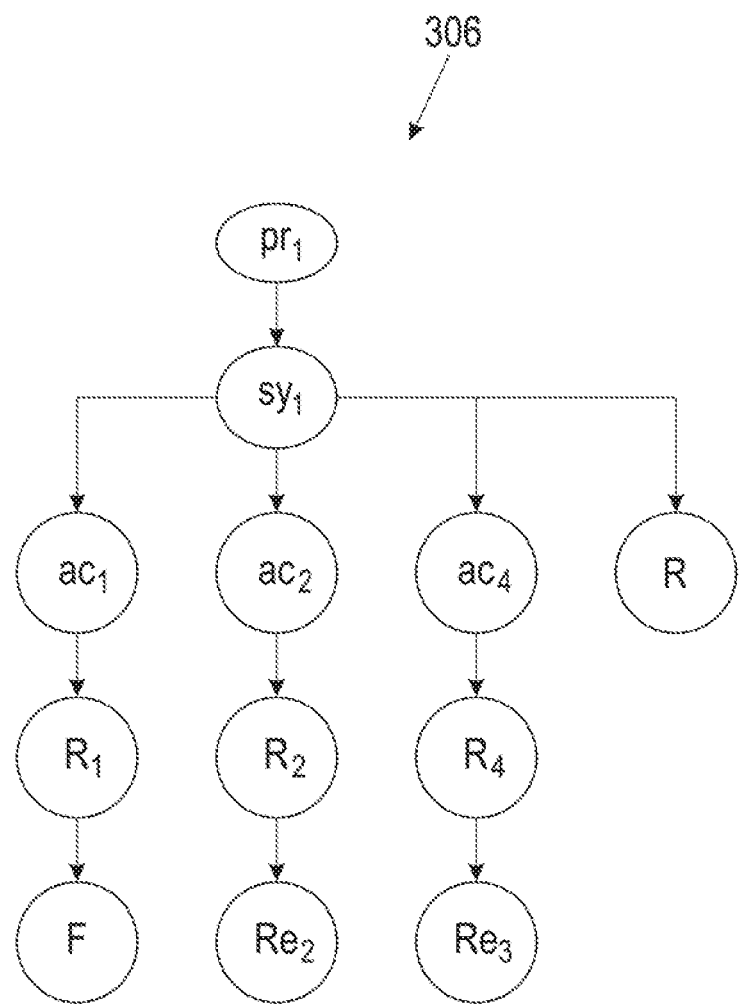

FIGS. 3A and 3B show a first example of combining two triaging trees in accordance with exemplary embodiments. FIG. 3A shows triaging trees 302, 304 that correspond to the same problem, denoted $pr_1$. In this example, the triaging tree 302 includes one symptom, $sy_1$. The triaging tree 302 depicts that a first action, $ac_1$, was taken, which results in a first response/result, $R_1$. In this example, $R_1$ fails to resolve the issue as indicated by the node labeled with an F. Triaging tree 302 also depicts that a second action, $ac_2$ is taken, which results in a second response/result, $R_2$. The second action results in a corresponding resolution as indicated by the node labeled $Re_2$. The node labeled with R represents a resolution action which resolved the problem $pr_1$.

FIG. 3A also depicts a second triaging tree 304, which includes the same problem and the same symptom, but has a different resolution. In particular, the left most path of triaging tree 304 is similar to the middle path in triaging tree 302, but this did not resolve the problem. As such, the triaging tree 304 includes another action, $ac_4$. The action results in another response/result, $R_4$, which resolved the problem as indicated by node Rea. As such, triaging trees 302, 304 correspond to the same problem and same symptom, but have different resolutions.

FIG. 3B shows a triaging tree 306 that is generated by combining the triaging trees 302, 304.

Figure 4A:
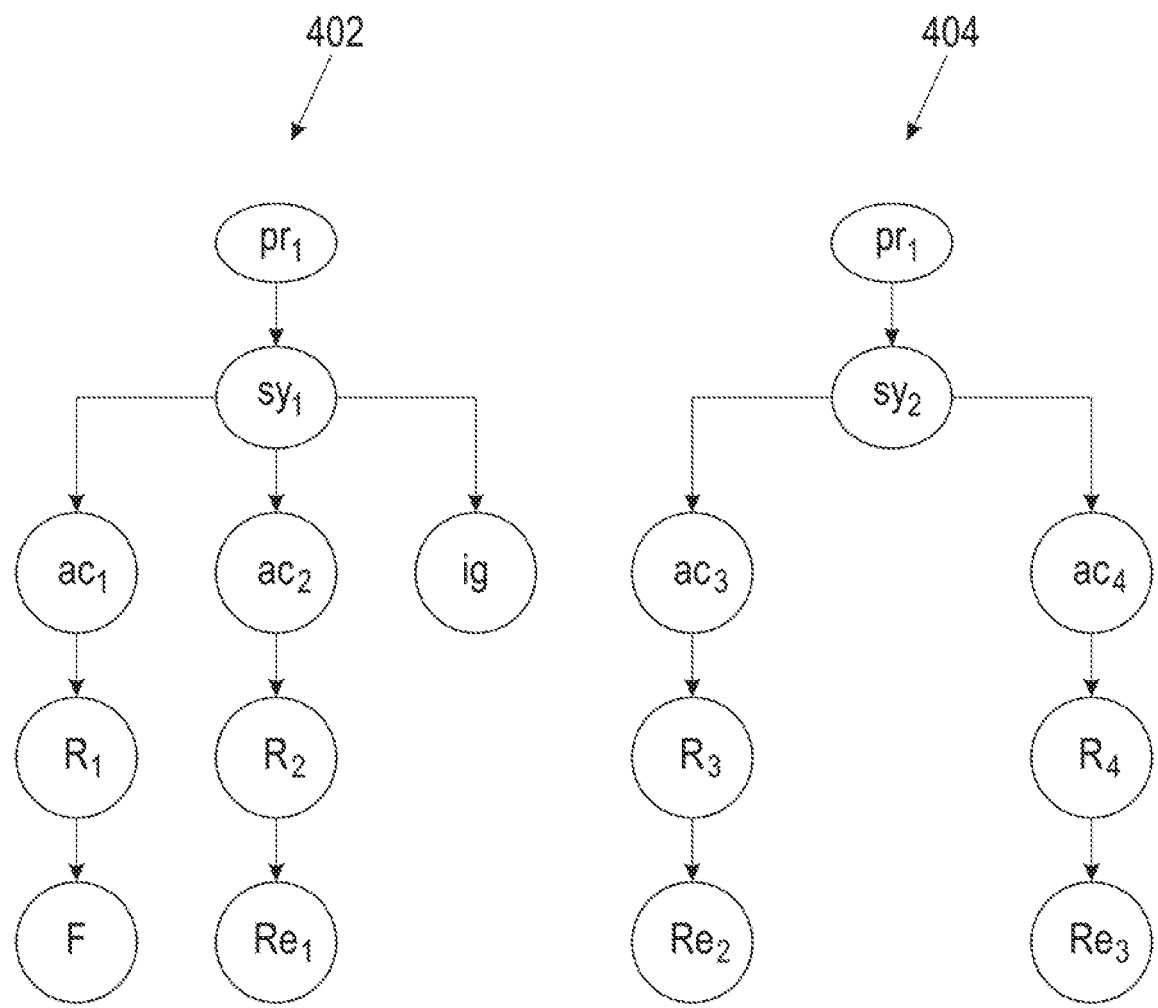
FIGS. 4A and 4B show a second example of combining triaging trees in accordance with exemplary embodiments.
Figure 4B:
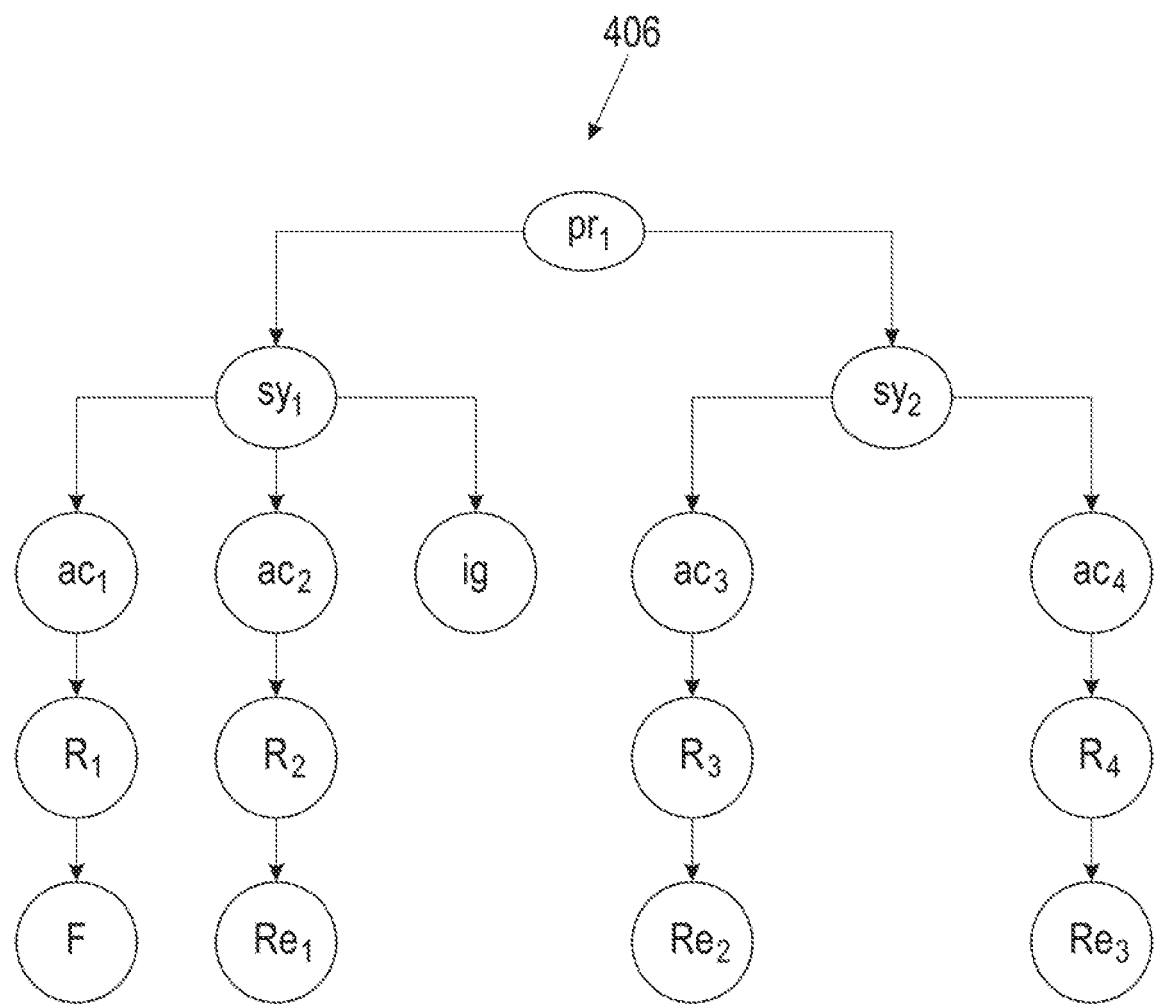

FIG. 4A shows another example of two triaging trees 402, 404 that are combined to form triaging tree 406 in accordance with exemplary embodiments. The nodes in triaging trees 402, 404, and 406 use similar notation as described above with respect to FIGS. 3A and 3B, except the node labeled "ig" in triaging tree 402 represents an investigation node. In the example shown in FIG. 4A, the triaging trees 402 and 406 correspond to the same problem but have different symptoms.

Figure 5A:
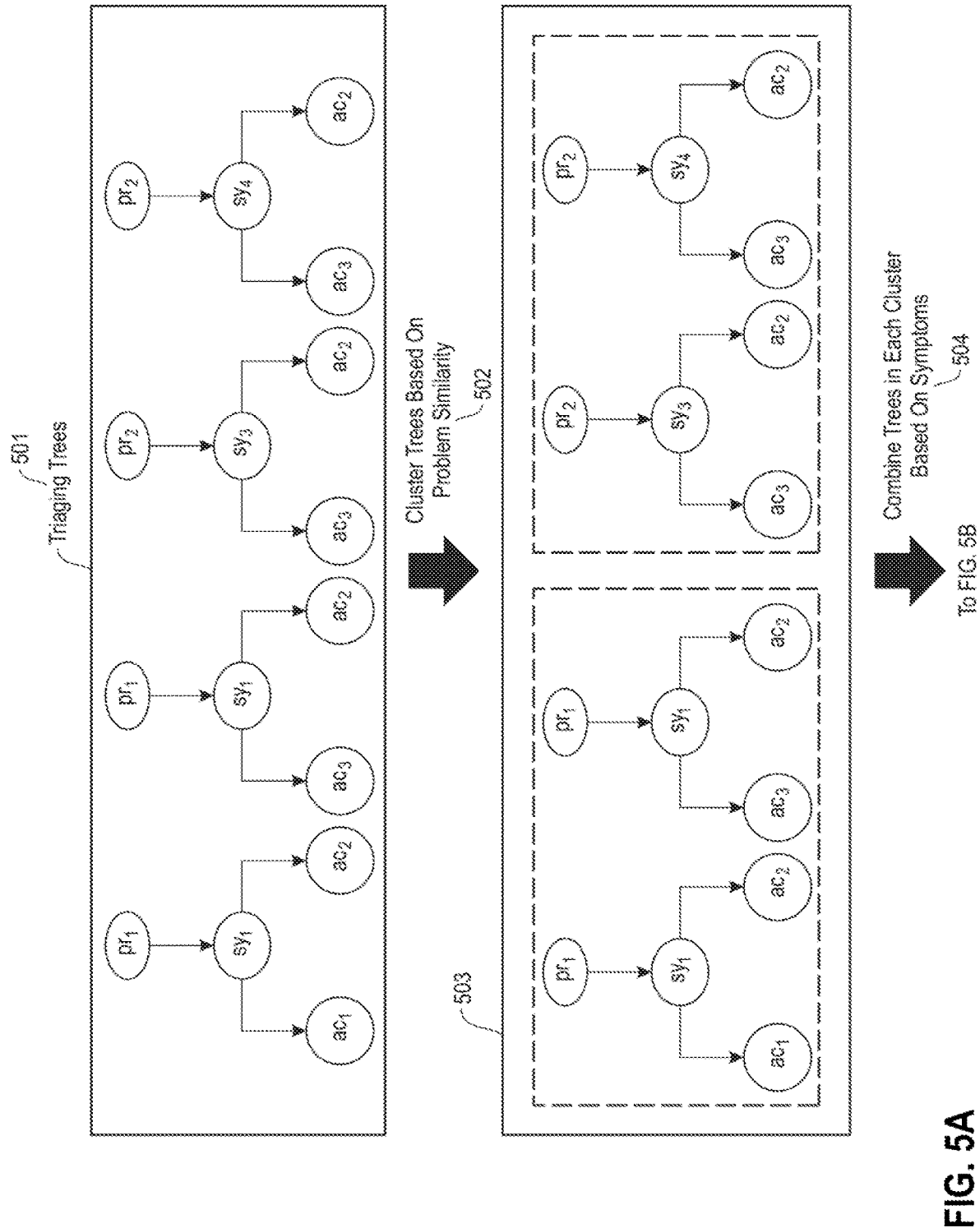
FIGS. 5A and 5B show a flow diagram of a process for creating playbooks in accordance with exemplary embodiments.
Figure 5B:
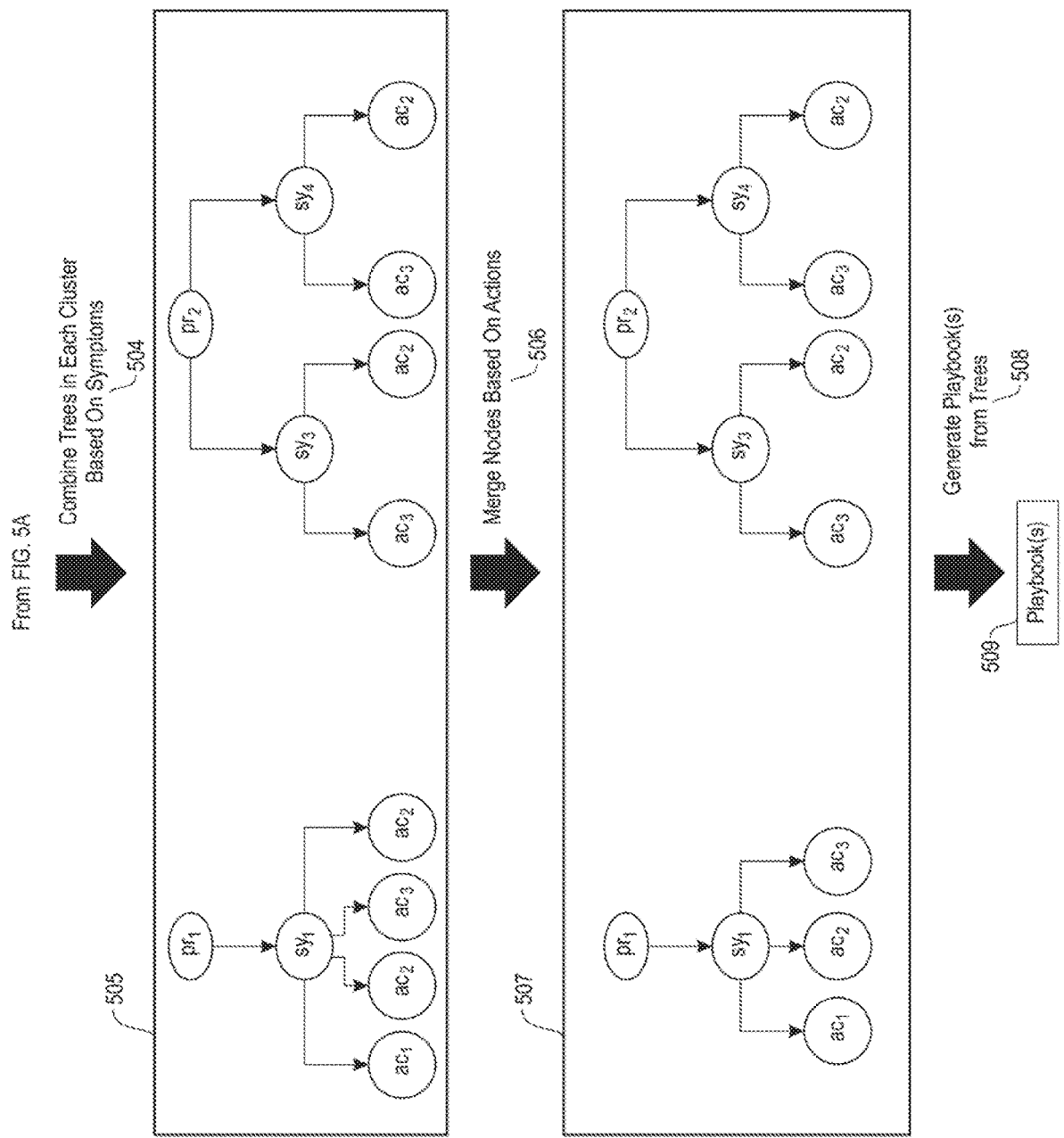

FIGS. 5A-5B (collectively referred to as FIG. 5) show a flow diagram of a process for creating playbooks in accordance with exemplary embodiments. Step 502 includes clustering multiple triaging trees 501 (e.g., stored in knowledge base 118) based on problem similarity. By way of example, the set of triaging trees 501 shown in FIG. 5A includes two trees corresponding to a first problem ($pr_1$) and two trees corresponding to a second problem ($pr_2$). The output 503 of step 502 is two clusters comprising the trees corresponding to each problem. In other words, the clustering groups trees corresponding to a same (or similar) problem in the same cluster.

Step 504 includes combining trees in each cluster based on the symptoms indicated in each tree and outputs trees 505. The cluster corresponding to $pr_1$ in the FIG. 5 example includes two trees with the same symptom (i.e., $sy_1$), which results in a tree having a single symptom node as shown in 505. The trees in the cluster corresponding to $pr_2$ do not share any symptoms, and so the only nodes that can be combined are the root nodes.

Step 506 includes merging the next level of nodes. The example depicted in FIG. example correspond to actions. In the FIG. 5 example, there are two nodes in the tree for $pr_1$ that correspond to the same action (i.e., $ac_2$) for the same symptom (i.e., $sy_1$), which are combined at step 506.

Step 508 includes generating one or more playbooks 509 based on the trees 507. As such, each playbook 509 may capture steps to diagnosis an issue in a specific domain.

Figure 6:
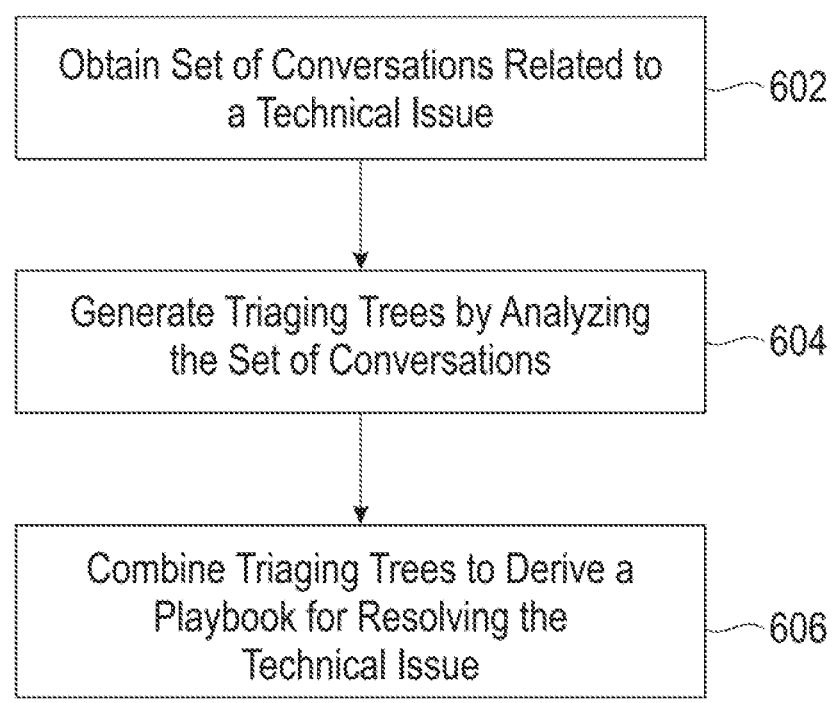
FIG. 6 is a flow diagram illustrating techniques in accordance with exemplary embodiments.

FIG. 6 is a flow diagram of a process in accordance with exemplary embodiments. Step 602 includes obtaining, from a multi-user platform, conversations related to at least one technical issue. Step 604 includes generating a plurality of triaging trees by analyzing the conversations, wherein each of the triaging trees stores information corresponding to temporal sequences of steps related to diagnosing and resolving said at least one technical issue. Step 606 includes deriving a playbook for resolving said at least one technical issue at least in part by combining two or more of the plurality of triaging trees.

The process may further include the steps of generating a multi-granular summary for at least one of the triaging trees, wherein the multi-granular summary comprises text summarizing the at least one triaging tree in multiple levels of detail; and outputting the text for at least one of said multiple levels of detail of said multi-granular summary. Generating the multi-granular summary for at least one of the triaging trees may include at least one of: populating a template using the information stored in the at least one triaging tree; and applying a trained neural network that maps the at least one tree to the text. The analyzing for a given one of the conversations may include: assigning one of a plurality of labels to parts of the given conversation, wherein the plurality of labels comprises labels for at least the following items: the at least one technical issue; one or more symptoms of the least one technical issue; one or more attempted actions to resolve the at least one technical issue; and one or more outcomes of the attempted actions. The analyzing for the given one of the conversations may further include identifying one or more entities within each labeled part of the given conversation. The process may further include a step of using a bi-directional long Short-Term Memory (LSTM) with a Conditional Random Field (CRF) layer to perform said assigning and said identifying. The process may include a step of determining a dependency among the plurality of labels. Generating the triaging tree for the given conversation may include populating the triaging tree by applying a relationship-attention model based on the assigned labels. The process may include a step of outputting at least a portion of the generated triaging trees for verification by a user; and retraining the relationship-attention model based on feedback received from said user in response to said outputting. Each conversation may be between two or more users of a multi-user platform, and the process may include identifying one or more further conversations on said multi-user platform; and updating said playbook based at least in part on said further conversations. In some example embodiments, the multi-user platform may be monitored to retrieve updated conversations or new conversations, which can be processed to revise the playbooks and/or add additional playbooks. The conversations may be retrieved, for example, on a periodic basis or be triggered by a user. In at least one example embodiment, the playbook may be used to automatically (e.g., without human intervention) remediate such issues.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 7:
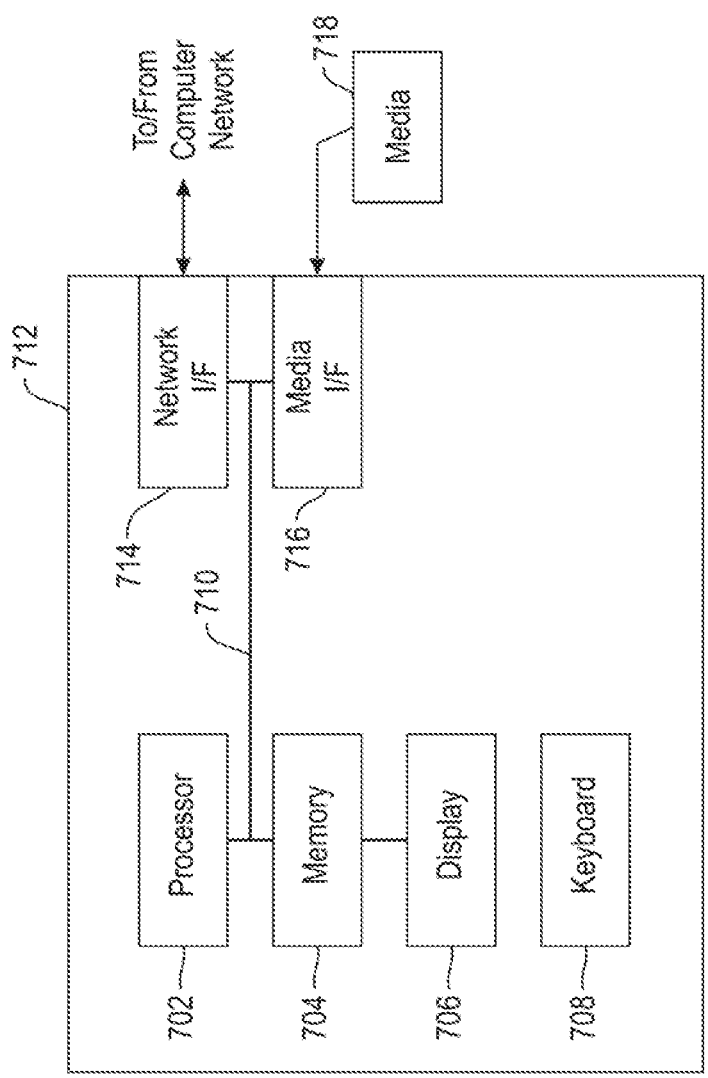
FIG. 7 is a system diagram of an exemplary computer system on which at least one embodiment of the present disclosure can be implemented.

Additionally, an embodiment of the present disclosure can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
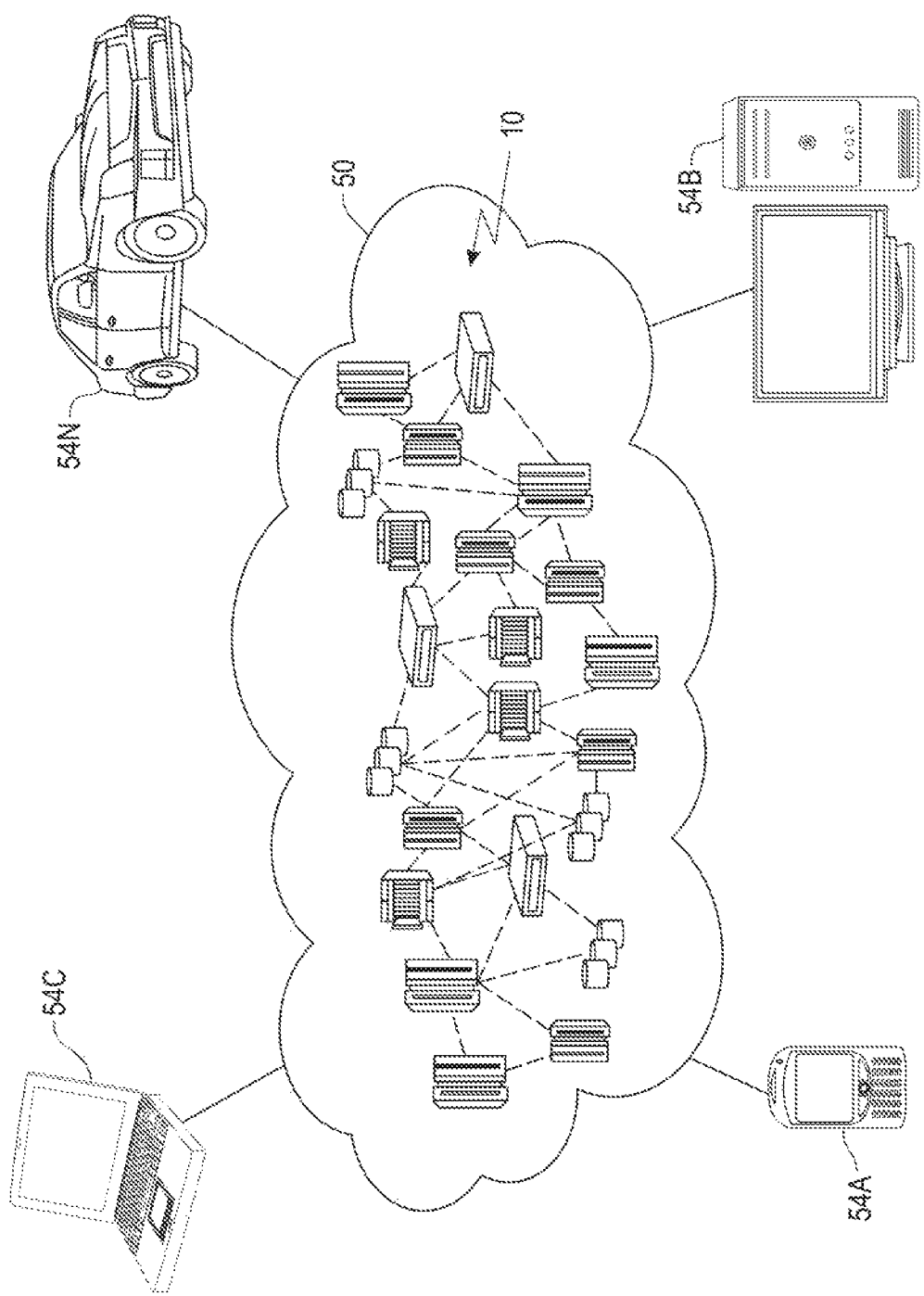
FIG. 8 depicts a cloud computing environment in accordance with exemplary embodiments.

Referring now to FIG. 8, illustrative cloud computing environment 50 is depicted. As shown, cloud computing environment 50 includes one or more cloud computing nodes 10 with which local computing devices used by cloud consumers, such as, e.g., personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
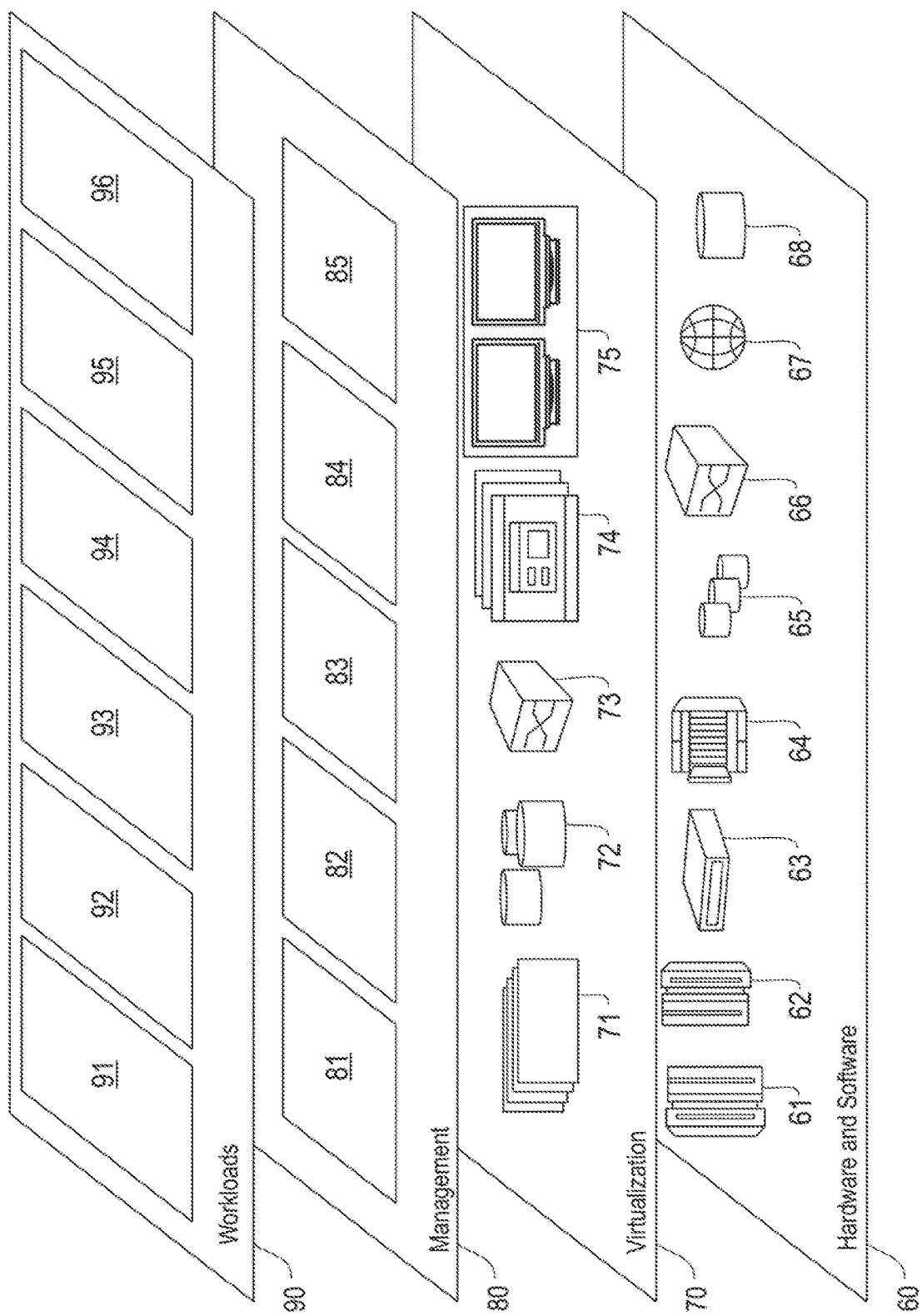
FIG. 9 depicts abstraction model layers in accordance with exemplary embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and creating triaging trees and playbooks by mining multi-party collaboration platforms 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, increasing the speed and efficiency of diagnosing, triaging, and/or remediating issues in, e.g., computing systems and software.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    obtaining, from a multi-user platform, conversations related to one or more technical issues;
    analyzing the conversations, wherein, for a given one of the conversations, said analyzing comprises assigning respective ones of a plurality of labels to corresponding parts of the given conversation and identifying one or more entities within each labeled part of the given conversation;
    generating a plurality of tree data structures based on the analyzing, wherein each of the tree data structures comprises a set of nodes for storing information corresponding to temporal sequences of steps related to diagnosing and resolving at least one of the one or more technical issues, wherein the set of nodes comprises a root node corresponding to the at least one of the technical issues, one or more symptom nodes, and one or more action nodes associated with one or more of the symptom nodes, and wherein the tree data structure corresponding to the given one of the conversations is populated based at least in part on the assigned labels and dependency information determined for the assigned labels by an attention model;
    combining at least a first tree data structure and a second tree data structure of the plurality of tree data structures in response to determining that the first and the second tree data structures comprise respective root nodes corresponding to a same one of the one or more technical issues, wherein the combining comprises merging respective symptom nodes of the first and second tree data structures that correspond to a same at least one symptom and merging respective actions nodes of the first and second tree data structures that correspond to a same at least one action; and
    deriving a sequence of steps for resolving said at least one technical issue based at least in part on the result of the combining;
    wherein the method is carried out by at least one computing device.

2. The method of claim 1, comprising:
    generating a multi-granular summary for at least one of the tree data structures, wherein the multi-granular summary comprises text summarizing the at least one tree data structure in multiple levels of detail; and
    generating an output for at least one user, wherein the output is controlled based at least in part on at least one of said multiple levels of detail of said multi-granular summary and one or more inputs of the least one user.

3. The method of claim 2, wherein generating the multi-granular summary for at least one of the tree data structures comprises at least one of:
    populating a template using the information stored in the at least one tree data structure; and
    applying a trained neural network that maps the at least one tree data structure to the text.

4. The method of claim 1, wherein the plurality of labels comprises labels for at least the following items:
    the at least one technical issue;
    one or more symptoms of the least one technical issue;

one or more attempted actions to resolve the at least one technical issue; and one or more outcomes of the attempted actions.

5. The method of claim 4, wherein the attention model comprises a bi-directional long short-term memory with a conditional random field layer.

6. The method of claim 1, comprising:
outputting at least a portion of the generated tree data structures for verification by a user; and
retraining the attention model based on feedback received from said user in response to said outputting.

7. The method of claim 1, wherein each of the conversations is between two or more users of a multi-user platform, and wherein the method comprises:
identifying one or more further conversations on said multi-user platform; and
updating the derived sequence of steps based at least in part on said further conversations.

8. The computer-implemented method of claim 1, wherein software is provided as a service in a cloud environment.

9. A computer program product comprising a computer readable storage medium having program instructions embodied therewith, the program instructions executable by a computing device to cause the computing device to:
obtain, from a multi-user platform, conversations related to one or more technical issues;
analyze the conversations, wherein, for a given one of the conversations, said analyzing comprises assigning respective ones of a plurality of labels to corresponding parts of the given conversation and identifying one or more entities within each labeled part of the given conversation;
generate a plurality of tree data structures based on the analyzing, wherein each of the tree data structures comprises a set of nodes for storing information corresponding to temporal sequences of steps related to diagnosing and resolving at least one of the one or more technical issues, wherein the set of nodes comprises a root node corresponding to the at least one of the technical issues, one or more symptom nodes, and one or more action nodes associated with one or more of the symptom nodes, and wherein the tree data structure corresponding to the given one of the conversations is populated based at least in part on the assigned labels and dependency information determined for the assigned labels by an attention model;
combining at least a first tree data structure and a second tree data structure of the plurality of tree data structures in response to determining that the first and the second tree data structures comprise respective root nodes corresponding to a same one of the one or more technical issues, wherein the combining comprises merging respective symptom nodes of the first and second tree data structures that correspond to a same at least one symptom and merging respective actions nodes of the first and second tree data structures that correspond to a same at least one action; and
derive a sequence of steps for resolving said at least one technical issue based at least in part on the result of the combining.

10. The computer program product of claim 9, wherein the program instructions executable by a computing device further cause the computing device to:
generate a multi-granular summary for at least one of the tree data structures, wherein the multi-granular summary comprises text summarizing the at least one tree data structure in multiple levels of detail; and
generate an output for at least one user, wherein the output is controlled based at least in part on at least one of said multiple levels of detail of said multi-granular summary and one or more inputs of the least one user.

11. The computer program product of claim 9, wherein the plurality of labels comprises labels for at least the following items:
the at least one technical issue;
one or more symptoms of the least one technical issue;
one or more attempted actions to resolve the at least one technical issue; and
one or more outcomes of the attempted actions.

12. The computer program product of claim 11, wherein the attention model comprises a bi-directional long short-term memory with a conditional random field layer.

13. The computer program product of claim 9, wherein the program instructions executable by a computing device further cause the computing device to:
output at least a portion of the generated tree data structures for verification by a user; and
retrain the attention model based on feedback received from said user in response to said outputting.

14. The computer program product of claim 9, wherein each of the conversations is between two or more users of a multi-user platform, and wherein the program instructions further cause the computing device to:
identify one or more further conversations on said multi-user platform; and
update the derived sequence of steps based at least in part on said further conversations.

15. A system comprising:
a memory; and
at least one processor operably coupled to the memory and configured for:
obtaining, from a multi-user platform, conversations related to one or more technical issues;
analyzing the conversations, wherein, for a given one of the conversations, said analyzing comprises assigning respective ones of a plurality of labels to corresponding parts of the given conversation and identifying one or more entities within each labeled part of the given conversation;
generating a plurality of tree data structures based on the analyzing, wherein each of the tree data structures comprises a set of nodes for storing information corresponding to temporal sequences of steps related to diagnosing and resolving at least one of the one or more technical issues, wherein the set of nodes comprises a root node corresponding to the at least one of the technical issues, one or more symptom nodes, and one or more action nodes associated with one or more of the symptom nodes, and wherein the tree data structure corresponding to the given one of the conversations is populated based at least in part on the assigned labels and dependency information determined for the assigned labels by an attention model;
combining at least a first tree data structure and a second tree data structure of the plurality of tree data structures in response to determining that the first and the second tree data structures comprise respective root nodes corresponding to a same one of the one or more technical issues, wherein the combining comprises merging respective symptom nodes of the first and second tree data structures that correspond to a same at least one symptom and merging respective actions nodes of the first and second tree data structures that correspond to a same at least one action; and deriving a sequence of steps for resolving said at least one technical issue based at least in part on the result of the combining.

16. The system of claim 15, wherein the at least one processor is configured for:

generating a multi-granular summary for at least one of the tree data structures, wherein the multi-granular summary comprises text summarizing the at least one tree data structure in multiple levels of detail; and generating an output for at least one user, wherein the output is controlled based at least in part on at least one of said multiple levels of detail of said multi-granular summary and one or more inputs of the least one user.

17. The system of claim 16, wherein generating the multi-granular summary for at least one of the tree data structures comprises at least one of:

populating a template using the information stored in the at least one tree data structure; and applying a trained neural network that maps the at least one tree data structure to the text.

18. The system of claim 15, wherein the plurality of labels comprises labels for at least the following items:

the at least one technical issue;

one or more symptoms of the least one technical issue;

one or more attempted actions to resolve the at least one technical issue; and one or more outcomes of the attempted actions.

19. The system of claim 18, wherein the attention model comprises a bi-directional long short-term memory with a conditional random field layer.

20. The system of claim 15, wherein the at least one processor is configured for:

outputting at least a portion of the generated tree data structures for verification by a user; and retraining the attention model based on feedback received from said user in response to said outputting.

* * * * *